Feb. 14, 1939. R. MOORE 2,147,264
COLLAR HOLDER
Filed April 21, 1937
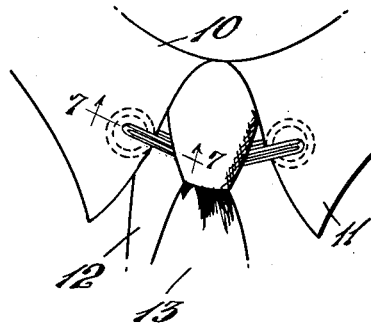
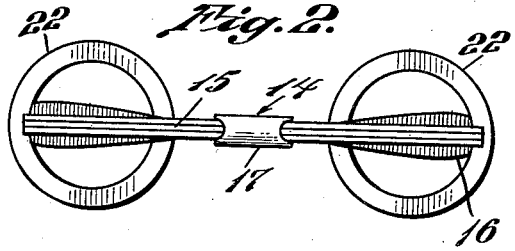
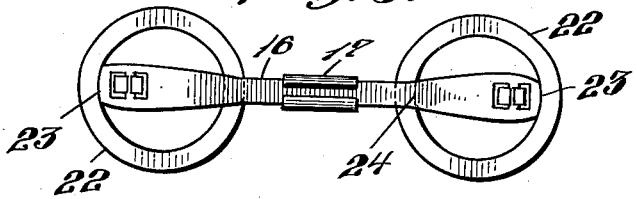
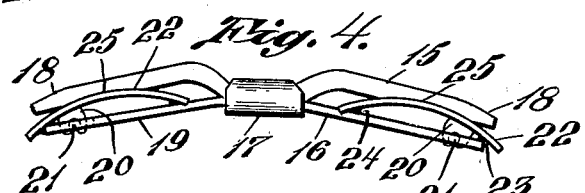
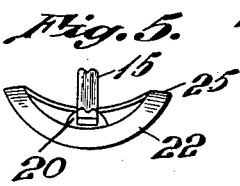
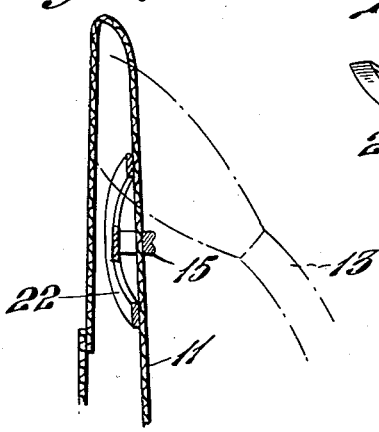
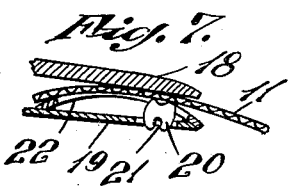
INVENTOR.
Robert Moore
BY Barlow & Barlow
ATTORNEYS.

Patented Feb. 14, 1939

2,147,264

UNITED STATES PATENT OFFICE 2,147,264

COLLAR HOLDER

Robert Moore, Providence, R. I., assignor to Freeman-Daughaday Company, a corporation of Massachusetts Application April 21, 1937, Serial No. 138,143

2 Claims. (Cl. 24—81)

This invention relates to a collar holder; and has for one of its objects the provision of a device which will grip the outer flaps of a soft or semi-soft collar to hold the same in desired position and which will be of such structure as to prevent the creasing or sharp bending of the collar about or adjacent to the grip of the collar by the holder in a direction lengthwise of the collar.

Another object of the invention is the provision of a collar holder which will stiffen the collar at the point of engagement of the collar and collar holder to prevent bending of the collar along a line which extends circularly of the collar.

Another object of the invention is the formation of a collar holder which may be easily and quickly slid into position on the collar and there maintained by reason of a better hold on the collar.

Another object of the invention is the formation of a collar holder which will be of attractive appearance when removed from the collar, although one which will more effectively function to perform its desired results when in position on the collar.

With these and other objects in view, the invention consists of certain novel features of construction, as will be more fully described, and particularly pointed out in the appended claims.

In the accompanying drawing:

Fig. 1 is a perspective view of the collar holder in working position and showing its relation to a collar and necktie;

Fig. 2 is a top plan view of the holder;

Fig. 3 is a bottom plan view of the holder;

Fig. 4 is a side elevation;

Fig. 5 is an end view of the holder;

Fig. 6 is a sectional view through the gripping point of the device on the collar;

Fig. 7 is a section on line 7—7 of Fig. 1 showing the arcuate disposition of the collar when the holder is attached.

It is found in the use of collar holders that when the collar holder is slid into position on the collar, which is usually on a soft collar, that, due to the existent forces the outer flap of the collar bends at the point of gripping of the jaws of the collar holder along a line longitudinally of the collar holder or somewhat circularly of the collar at the point of gripping the collar holder on the collar flap. This distinct bending or break in the collar detracts from the smooth appearance that it is desired that the collar maintain; and in order to maintain the collar with a smooth outer surface, stiffening devices have been used which force the points of the collar away from the fold to obtain the straightened or stiffened effect, or such stiffening devices may consist of inserts in pockets in the collar, or various other means to obtain this stiffening of the collar. None of these means, however, have been carried by the collar holder, and in order that such stiffening means may be provided and be a unit with the collar holder, I have provided a frame-shaped member attached to the back jaw of the collar holder which serves to arc the portion of the collar which is gripped along a line extending up and down on the collar so as to stiffen the same against any bending along a horizontal line lengthwise of the collar; and the following is a more detailed description of the present embodiment of this invention, illustrating the preferred means by which these advantageous results may be accomplished:

With reference to the drawing, 10 designates a collar having an outer flap 11, the same being mounted upon a shirt 12 with a necktie 13 in position beneath the outer flap of the collar. The collar holder designated generally 14 consists of a pair of bars 15 and 16 which are bound together at their middle portions by a band 17 providing oppositely disposed pairs of jaws each comprising a front jaw 18 and a back jaw 19. A cam 20 is rockably positioned on a pivot 21 in the back jaw 19 to engage the under surface of the front jaw 18 so that as the flap 11 of the collar is inserted between these jaws it will be engaged by the cam and firmly bound in position. Upon each of the back jaws a frame member 22 consisting of a piece of sheet stock of generally circular formation or other shape is secured by attachment as at 23 to the end of the back jaw and as at 24 to the inner surface of the back jaw.

This frame member 22 is arcuate or curved forwardly as at 25 (see Fig. 4) and serves by reason of this shape to guide the flap of the collar and afford an easier entrance between the jaws 18 and 19 and also serves to dispose the outer flap of the collar in an arc-shaped formation with the axis of the arc running up and down the collar and at right angles to the jaws, as perhaps is best seen in Fig. 7, which arc-shaped formation although not particularly pronounced is sufficient to stiffen the collar and prevent a creasing or bending of the collar about a horizontal line and thus serves to prevent a break or crease line running circularly of the collar, such as has previously been present and desired to be avoided. The particular member 22, which I have provided, is one suitable stiffening means, although it will be understood that this stiffening of the collar may take other forms.

This frame-shaped formation of the back jaw also by supporting the collar serves to provide a better grip on the collar and to friction against the back of the collar to prevent any easy removal of the holder from the flap of the collar and provides the desired stiffening and smooth appearance which is sought after.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A collar holder comprising oppositely directed pairs of jaws for gripping the flaps of a collar, each pair of jaws comprising a front jaw and a back jaw, and a frame supported on each back jaw and having portions extending outwardly therefrom to engage the back of the collar flap at points transversely spaced from the longitudinal extent of the jaws.

2. A collar holder comprising oppositely directed pairs of jaws for gripping the flaps of a collar, each pair of jaws comprising a front jaw and a back jaw, and a frame supported on each back jaw and having portions on each side thereof to engage the back of the collar flap at points transversely spaced from the longitudinal extent of the jaws, said frame being disposed on an arc with an axis extending at right angles to the longitudinal extent of the jaws.

ROBERT MOORE.